United States Patent [19]
Dolman et al.

[11] Patent Number: 5,923,647
[45] Date of Patent: Jul. 13, 1999

[54] CIRCULATOR USAGE IN TIME DIVISION DUPLEX RADIOS

[75] Inventors: Rodney A. Dolman, Cary; Terrence E. Rogers, Durham, both of N.C.

[73] Assignee: Ericsson Inc., Research Triangle Park, N.C.

[21] Appl. No.: 08/709,287

[22] Filed: Sep. 6, 1996

[51] Int. Cl.$^6$ ........................................... H04J 3/00
[52] U.S. Cl. ............................................. 370/280; 455/83
[58] Field of Search ................................. 455/82, 83, 86, 455/78, 80, 81, 114, 101, 272, 279.1, 117, 50.1; 333/202, 203, 204, 219; 370/280, 282, 278, 275, 276, 234

[56] References Cited

U.S. PATENT DOCUMENTS

| 4,380,822 | 4/1983 | Broton | 455/80 |
| 5,347,241 | 9/1994 | Panaretos et al. | 333/1.1 |
| 5,590,412 | 12/1996 | Sawai et al. | 455/82 |
| 5,701,595 | 12/1997 | Green, Jr. | 455/83 |
| 5,760,665 | 6/1998 | Turunen et al. | 333/204 |

FOREIGN PATENT DOCUMENTS

| 0 618 635 | 10/1994 | European Pat. Off. | H01P 1/15 |
| 0 740 427 | 10/1996 | European Pat. Off. | H04B 1/48 |

OTHER PUBLICATIONS

Patent Abstracts of Japan, vol. 96, No. 11, Nov. 29, 1996 & JP 08 195695 A (MURATA MFG CO LTD), Jul. 30, 1996.

Patent Abstracts of Japan, vol. 14, No. 502 (E–0997), Nov. 2, 1990 & JP 02 209024 A (SEIKO EPSON CORP) Aug. 20, 1990.

*Primary Examiner*—Ajit Patel
*Assistant Examiner*—Chiho Andrew Lee
*Attorney, Agent, or Firm*—Burns, Doane, Swecker & Mathis, L.L.P.

[57] ABSTRACT

A communications apparatus for coupling a transmitter and receiver for duplex transmission is disclosed. The apparatus comprises a transmitter with a transmit power amplifier, a receiver with a receive filter, and a circulator with a plurality of ports, wherein the transmit power amplifier is connected to a first port of the circulator and the receiver filter is connected to a second port of the circulator. An antenna is demountably connected to a third port of the circulator. A switch alternately connects a load and the receiver to the second port of the circulator, wherein the receiver is connected to the second port of the circulator during reception of signals and the load is connected to the second port of the circulator during transmission so as to absorb power reflected by the antenna.

9 Claims, 3 Drawing Sheets

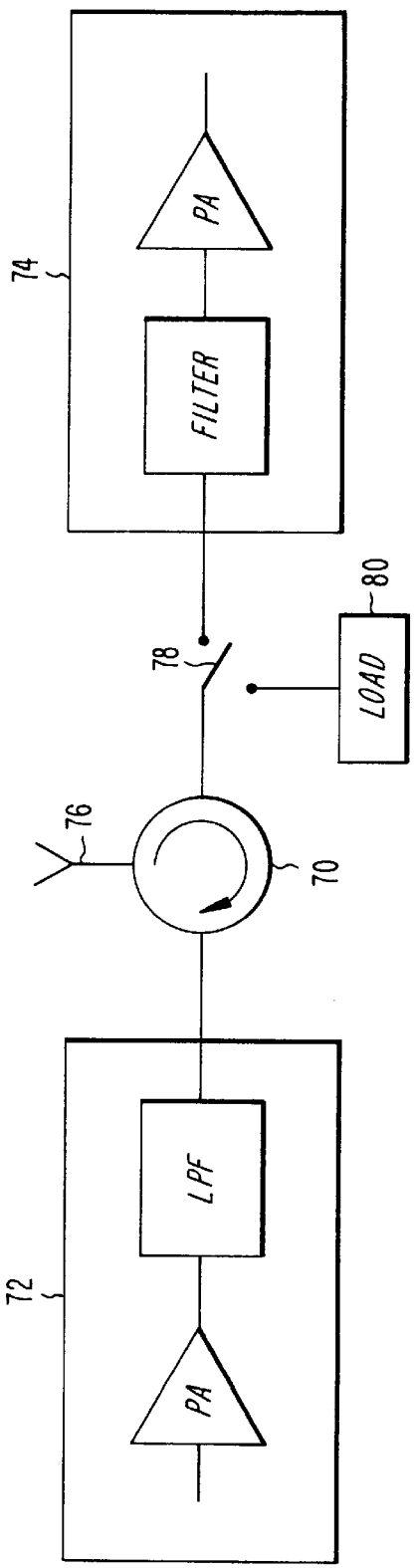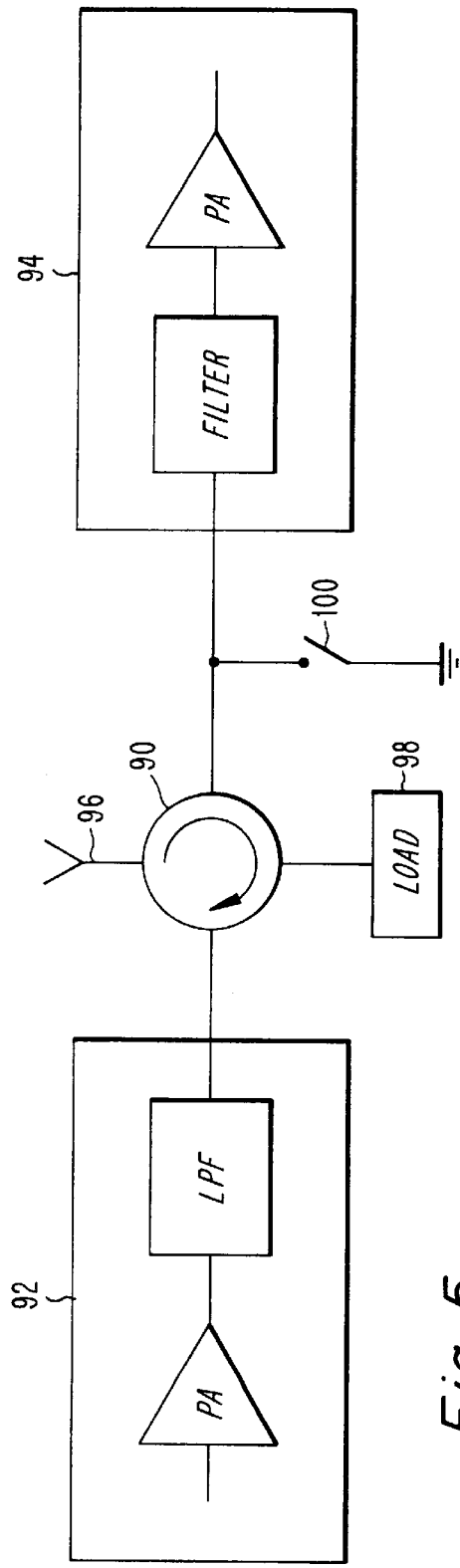

CIRCULATOR USAGE IN TIME DIVISION DUPLEX RADIOS

FIELD OF THE INVENTION

The present invention relates to a radio transmitter/receiver apparatus for transmission and reception of information, and in particular provides a means to couple a transmitter and a receiver to a common antenna in a duplex radio without the need for a duplexing filter, with reduced transmit path loss and with reduced power handling requirements for T/R switch components.

BACKGROUND OF THE INVENTION

The present invention relates to a radio transceiver for providing duplex radio communications by alternately transmitting and receiving on a time division basis. This system is called time division duplex or TDD. In such a system, the antenna needs to be connected at any instant to either the transmitter or receiving but not to both simultaneously.

A transmitter and receiver operate in time division duplex to transmit and receive respectively in different time slots of a time division multiple access (TDMA) frame period. A known transmitter/receiver or transceiver is illustrated in FIG. 1. A transceiver 10 includes a transmitter section 12 and a receiver section 14. The transmitter section 12 and receiver section 14 are connected to a common antenna 16 by means of a transmit/receive switch 22. The transmit/receive switch 22 alternately connects the antenna 16 to either the transmitter section 12 for transmission or the receiver section 14 for reception of signals. The transmit/receive switch 22 is controlled by a control means in a known manner which is not illustrated. For transmission, the transmit/receive switch 22 connects the antenna 16 to the transmitter section 12, wherein the signals to be transmitted are amplified in a power amplifier 16 and low pass filtered in a filter 20 which removes unwanted harmonics introduced by the power amplifier 18. The filtered signals are then applied to the antenna and transmitted. For reception, the transmit/receive switch 22 connects the antenna 16 to the receiver section 14 wherein signals that are received by the antenna 16 are sent to the receiver section and are filtered by the receiver filter 24 and are then further processed accordingly to a known manner. The transmit/receive switch 22 is usually a diode or MOSFET device. Certain kinds of communications systems must meet transmit spectral component (or side band) intermodulation requirements. These include all those which have variable power modulation envelopes such as DAMPS (USA Digital Advanced Mobile Phone Service), PDC (Japan Personal Digital Cellular phone) and other common digital telephone protocols and all other forms of AM and QAM (quadrature phase related amplitude modulation). Transmit receive switches, particularly those made of diodes and FET switches, can distort the modulation envelope because their conduction is affected by the transmitted signal. This will require increased size, additional biasing or other undesirable and costly methods to combat the problem.

A further problem of using a simple T/R switch antenna coupling is that power may be reflected back from the antenna to the transmitter which effectively changes the power amplifier load impedance which can degrade the amplifier's own intermodulation characteristics. It is undesirable to combat this effect by increasing the power handling capability of the amplifier, especially in portable equipment, as this reduces power efficiency and thus battery life. High power amplifiers may damage T/R switch components if there is a large amount of reflected power from the antenna.

Another way to form a transceiver is to use a multiport circulator or isolator as illustrated in FIG. 2. In FIG. 2, a three port circulator 36 is used to connect a transmit section 32 and a receive section 34 with an antenna 38. FIG. 2 illustrates the functioning of the circulator 36. A B C illustrate connections and in this example, it can be assumed that the circulator has a throughput attenuation of approximately 0.8 dB from the connection A to B, from B to C, and from C to A. The reverse isolation is at least 12 dB, i.e., from connection B to A, and A to C, and finally from C to B. For proper functioning of the circulator, all inputs and outputs are loaded with an impedance of 50 ohms whereby the back isolation can be kept high. Thus, the circulator allows for signals to be transmitted to pass from the transmitter to the antenna with low attenuation but not to the receiver, (if all transmit power is absorbed by the antenna). In the prior art, using this circulator antenna duplex connection means any transmit power reflected by the antenna would be conducted to the receiver which must therefore have increased power handling capability for this eventuality. If the transmitter and receiver operated in somewhat different frequency bands, then the receiver input filter 40 would in turn reflect the transmitter power once again to the transmitter, producing the undesirable effects described above. This may happen to a lesser degree even if the frequency is the same due to receiver filter mismatches, which are common. However, in the prior art, signals received at another transmitter's frequency pass to the receiver where they are reflected by the receiver input filter 40 since the signals are out-of-band signals. Signals reflected from the receiver and back to the circulator will, in the prior art, be passed to the transmitter with low attenuation by the circulator where the reflected signal may appear as an impedance mismatch if the reflection is of the transmitter's own signal or would give rise to so-called back intermodulation if the reflected signal is another transmitter's signal.

One way to prevent the reflected signal from being passed to the transmitter is to use a four port circulator as illustrated in FIG. 3. In FIG. 3, a transmitter section 52 is connected to a first port of a circulator 54, an antenna 60 is connected to a second port of the circulator 54, and a receive section 56 is connected to a third port of the circulator 54. Finally, a load 58 is connected to the fourth port of the circulator 54 wherein signals reflected by the receive section 56 are diverted to the load 58 rather than the transmitter section 52. The four port circulator will isolate the transmitter from any antenna reflections but not the receiver. It forms a satisfactory antenna coupling apparatus only if there is no antenna reflection but otherwise reflected transmitter power flows into the receiver where it may overload it. The power reflected from the receiver will go to the load and therefore not effect the transmitter. It should be noted, however, that two non-reciprocal 180 degree paths are required for a four port device as compared with one for a three port device. Since this phase shifter, usually ferrite, forms the bulk of the circulator, a four port device is twice as big and more than twice as costly as a three port device.

Thus, there is a need for a method and an apparatus for preventing reflected signals from being transmitted back to a transmit section of a transceiver without introducing unwanted losses within the system.

SUMMARY OF THE INVENTION

It is an object of the present invention to overcome the problems associated with the prior art by providing a means and an apparatus for coupling a transmitter and receiver to a common antenna in a duplex radio without the need for a duplexing filter, with reduced transmit path loss and with reduced power handling requirements for T/R switch components.

According to one embodiment of the present invention, a communications apparatus for coupling a transmitter and receiver for duplex transmission is disclosed. The apparatus comprises a transmit means with a transmit power amplifier, a receiver with a receive filter means, and a circulator with a plurality of ports, wherein said transmit power amplifier is connected to a first port of said circulator and said receiver filter means is connected to a second port of said circulator. A transmitter/receiver device is demountably connected to a third port of said circulator. A switching means alternately connects a load means and said receiver to said second port of said circulator, wherein said receiver is connected to said second port of said circulator during reception of signals and said load is connected to said second port of said circulator during transmission so as to absorb power reflected by said transmitter/receiver device.

According to another embodiment of the present invention, a communications apparatus for a transmitter and receiver for duplex transmission is disclosed. The apparatus comprises a transmit means with a transmit power amplifier, a receiver with a receive filter means, and a circulator with a plurality of ports, wherein said transmit power amplifier is connected to a first port of said circulator and said receiver filter means is connected to a second port of said circulator. A transmitter/receiver device is demountably connected to a third port of said circulator and a load means is connected to a fourth port of said circulator. A switching means shorts said receiver to ground during transmission so that power reflected by said transmitter/ receiver device is absorbed by said load means.

According to yet another embodiment of the present invention, a communications apparatus having a transmitter and receiver for duplex transmission is disclosed. The communications apparatus comprises a transmit power amplifier, a receiver filter means, and a circulator with a plurality of ports wherein the transmit power amplifier is connected to a first port and the receiver filter is connected to a second port of the circulator. A transmit/receive device is demountably connected to a third port of the circulator. An impedance means is located between the circulator and the receive filter wherein the impedance means is a predetermined distance from the receive filter, wherein the impedance means dissipates power reflected by the receive filter means when the transmitter is transmitting.

BRIEF DESCRIPTION OF THE DRAWINGS

These and other features and advantages of the invention will be readily apparent to one of ordinary skill in the art from the following written description, used in conjunction with the drawings, in which:

FIG. 4 illustrates a three port transceiver device according to one embodiment of the present invention;

FIG. 5 illustrates a four port transceiver device according to another embodiment of the present invention.

DETAILED DESCRIPTION

Figure 1:
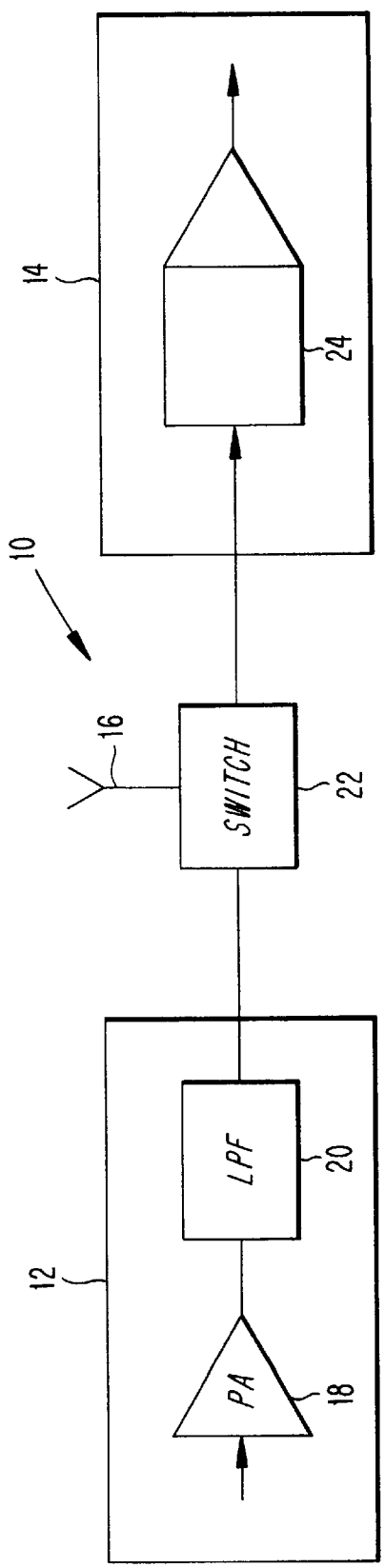
FIG. 1 illustrates a known transceiver device with a transmit/receive switch.
Figure 2:
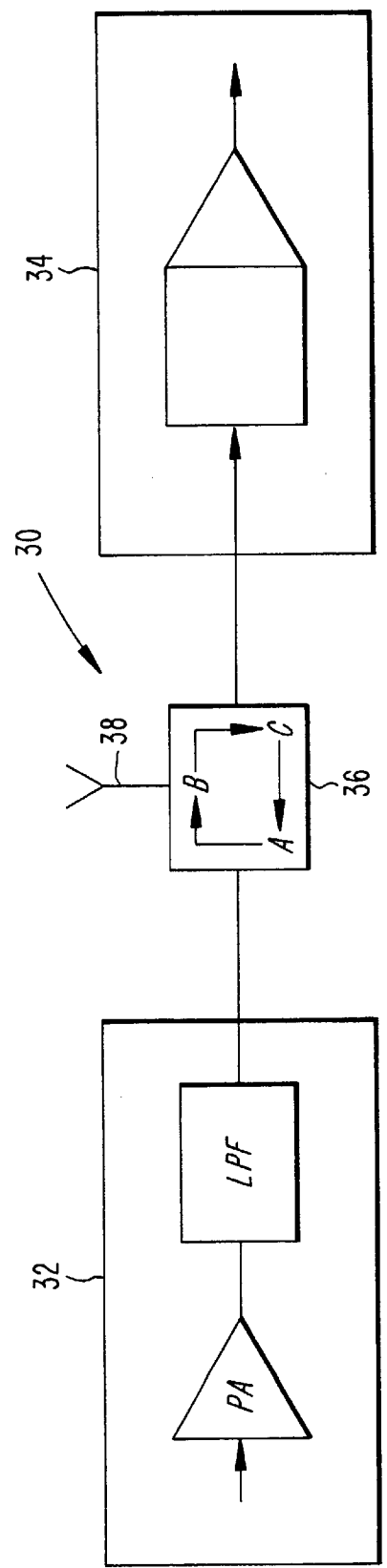
FIG. 2 illustrates a known transceiver device with a three port circulator.
Figure 3:
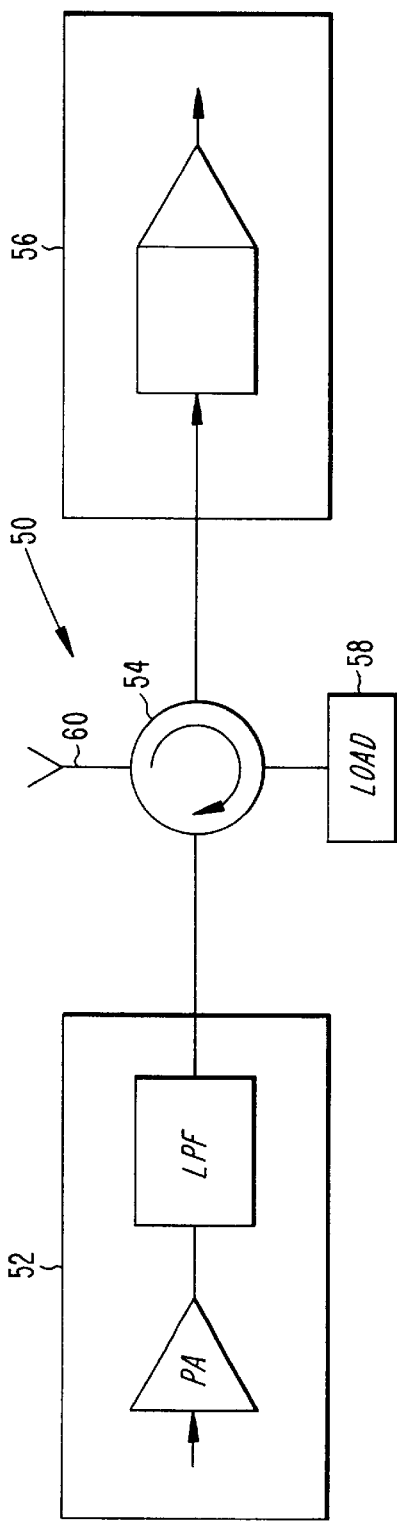
FIG. 3 illustrates a known transceiver device with a four port circulator.

The above deficiencies of the prior art are avoided by practicing the present invention which comprises using a switch at a receiver port of a three port circulator operated by a time division duplex control signal alternately to couple a matching impedance to the receive port of the circulator when the transmitter is active in such a way that the signals received or reflected from the antenna during transmission are dissipated in the matching impedance and are thus substantially prevented from reaching the transmitter.

FIG. 4 illustrates a three port transceiver according to one embodiment of the present invention. In this embodiment, a three port circulator 70 is used to connect a transmit section 72 and a receive section 74 with an antenna 76. In this embodiment, the receiver port of the circulator 70 is switched between the receiver section 74 and the load 80 by a transmit/receive switch 78. The circulator 70 is connected to the load 80 when the transceiver is transmitting. By connecting the load to the receiver port of the circulator during transmission reflections from the antenna during transmission are detoured to the load 80. In almost all cases and certainly for all normal operations, the power level of the signal at the FET, pin diode, or other T/R switch 78 is at least several times less than the power at the antenna. Thus, the T/R switch 78 need not be of the same size, quality or cost as the switch required in the arrangement disclosed in FIG. 1.

A circulator would be required even if the T/R switch were in the position as in FIG. 1 since the reflected power from the antenna would change the transmitter load and thus produce the detrimental effects described above. The normal solution is to place the circulator in the transmitter output without otherwise changing the diagram. Thus, the T/R switch is still connected directly to the antenna and must handle full and reflected power without degradation. This approximately doubles the path loss from the transmitter to the antenna since the power must flow first through the circulator and then through the T/R switch. This shortens the battery life in a portable unit. If the T/R switch is moved to the position as shown, then its attenuation is not added to the transmitter path.

High level reflected power may still cause distortion in the T/R switch but most of this power will be absorbed by the load. An added power detector on the load makes possible a transmitter power reduction at very high antenna mismatches if necessary. This also shrinks the circulator and even the load since it may not need to dissipate much power.

In this embodiment, there is more attenuation in the receiver path as compared to previous systems. However, system specifications are usually written in such a way that there is a margin in receiver sensitivity by several dB but, in practice and because of battery life requirements, very little margin is provided in transmitter output. It is therefore a better option to place increased loss in the receiver path rather than have it remain in the transmitter path.

FIG. 5 illustrates a four port transceiver according to another embodiment of the present invention. A four port circulator 90 is used to connect a transmit section 92, a receive section 94, and a load 98 to an antenna 96. During transmission, a switch 100 is closed which shorts the receiver port of the circulator 90 to ground which causes the power reflected by the antenna to be sent to the load 98. During reception, the switch 100 is open thus allowing the receiver section 94 to receive the signals from the antenna 96. The shorting switch 100 may be constructed out of lower cost, lower power consumption and less linear parts than a transmit/receive switch placed directly at the antenna because the shorting switch 100 is not in the power path. For example, the switch 100 may be a simple transistor (BJT or FET).

Figure 6:
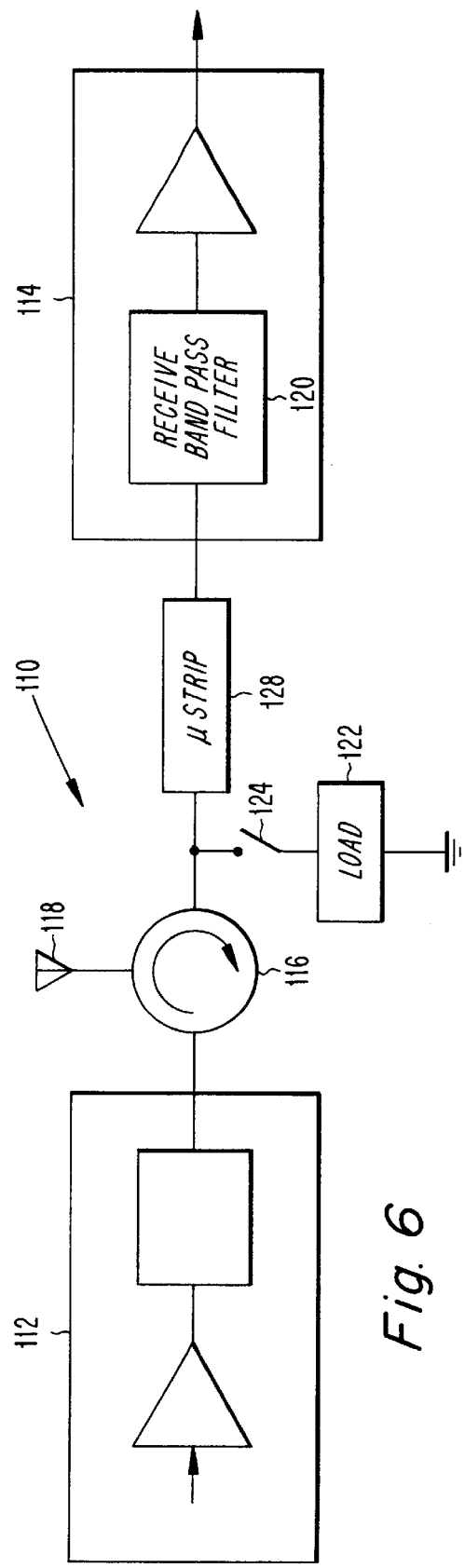
FIG. 6 illustrates a transceiver device according to one embodiment of the present invention.

FIG. 6 illustrates a transceiver according to one embodiment of the present invention. In the transceiver 110, a transmitter section 112 and a receiver section 114 are connected to different ports of a three port circulator or isolator 116. A transmitter/receiver device such as an antenna 118 is connected to the last port of the circulator 116. In one embodiment of the present invention, the inputs and outputs of the transmitter, the receiver, and the antenna are loaded with an impedance of approximately 50 ohms, but the present invention is not limited thereto. Just as in the prior art transceivers, signals received at another transmitter's frequency or frequencies produced by the transmitter itself may pass to the receiver where they will be reflected by the receiver's input filter 120. However, in the present invention, the reflected signals are not reflected back to the transmitter section 112, but rather are dissipated in a load 122, such as a resistor, which is controlled by a time division duplex control switch 124. The switch 124 is controlled by a time division duplex controller (not illustrated) which produces TDD control signals which alternately couples the load 122, to the receive port of the circulator when the transmitter is active in such a way that the signals received or reflected from the antenna during transmission are dissipated in the matching impedance and are thus substantially prevented from reaching the transmitter. Thus, in the example described above where the transmitter, receiver and antenna are loaded with an impedance of 50 ohms, the load 122 should also have an impedance of approximately 50 ohms.

In order for the received or reflected signals to be dissipated in the matching impedance, the matching impedance must be a predetermined distance away from the receive filter. By varying the length of the strip line 128, the node N1 can look like an opening or a short at the transmit frequency. The predetermined distance can be determined using a Smith Chart. The Smith chart graphically illustrates transmission line impedance transforms. Circles of constant reflection coefficients are concentric with the center of the chart (R/Zo=1.0). The voltage standing wave ratio (VSWR) magnitudes are given by their horizontal intercepts. Radial lines from the center are loci of constant phase angle, read against the degree or fractional wavelength scales at the circumference of the chart. Normalized values of impedance seen as one moves along the line can be read at each radial intercept from the resistance and reactance grids on which the circle of constant VSWR has been drawn. Often, but not always, the strip line 128 will be $\lambda/4$ because the filter will be a near short at the transmitter frequecny which will make the input at the circulator 116 an open circuit. All of the transmitter power thus flows into the load 122 which has a much lower impedance than the transmission line at the transmitter frequency.

In the present embodiment, the length of the strip line 128 is selected so that the node N1 looks like an opening. In the transmit mode, the receiver is off, thus, the node N1 looks like an opening. If the switch 124 is closed and the antenna is removed, then all of the reflected power will be dumped through the opening into the load 122. Thus, none of the power is reflected back to the power amplifier.

It will be appreciated by those of ordinary skill in the art that the present invention can be embodied in other specific forms without departing from the spirit or central character thereof. The presently disclosed embodiments are therefore considered in all respects to be illustrative and not restrictive. The scope of the invention is indicated by the appended claims rather than the foregoing description, all changes that come within the meaning and range of equivalents thereof are intended to be embraced therein.

We claim:

1. A communications apparatus for a transmitter and receiver for duplex transmission, comprising:

a transmit means with a transmit power amplifier;

a receiver with a receive filter means;

a circulator with a four ports, wherein said transmit power amplifier is connected to a first port of said circulator and said receiver filter means is connected to a second port of said circulator;

a transmitter/receiver device which is demountably connected to a third port of said circulator;

a load means connected to a fourth port of said circulator; and a switching means for shorting said receiver to ground during transmission so that power reflected by said tramsmitter/receiver device is absorbed by said load means.

2. A communications apparatus according to claim 1, wherein said switching means is a simple transistor.

3. A communications apparatus for a transmitter and receiver for duplex transmission, comprising:

a transmit means with a transmit power amplifier;

a receiver with a receive filter means;

a circulator with three ports, wherein said transmit power amplifier is connected to a first port of said circulator and said receiver filter means is connected to a second port of said circulator;

a transmitter/receiver device which is demountably connected to a third port of said circulator; and an impedance means located between said circulator and said receiver filter means, wherein said impedance means is a predetermined distance from said receive filter means in such a way that the signals received or reflected from the antenna during transmission are dissipated in a matching impedance and are thus substantially prevented from reaching the transmitter.

4. A communications apparatus according to claim 3, wherein said impedance means comprises a stripline structure.

5. A communications apparatus according to claim 3, wherein said impedance means is located a predetermined distance from the receiver filter means, wherein the location of the impedance means looks like an opening at the transmit frequency.

6. A communications apparatus according to claim 3, wherein inputs and outputs of the transmitter, the receiver and the transmitter/receiver device are loaded with an impedance of approximately 50 ohms.

7. A communications apparatus according to claim 6, wherein said impedance means has an impedance of approximately 50 ohms.

8. A communications apparatus according to claim 3, wherein said transmitter/receiver means is an antenna.

9. A communications apparatus according to claim 3, wherein a low pass filter is connected between said transmit power amplifier and said circulator so as to filter out of a transmit signal any harmonics produced by the transmit power amplifier.

* * * * *